United States Patent
Busch

(10) Patent No.: US 8,929,712 B2
(45) Date of Patent: Jan. 6, 2015

(54) DISPLAY FOR DISPLAYING PROGRESS

(75) Inventor: Hans-Juergen Busch, Buechenbach (DE)

(73) Assignee: Robert Bosch GmbH, Stuttgart (DE)

( * ) Notice: Subject to any disclaimer, the term of this patent is extended or adjusted under 35 U.S.C. 154(b) by 999 days.

(21) Appl. No.: 12/282,703

(22) PCT Filed: Oct. 15, 2007

(86) PCT No.: PCT/EP2007/060969
§ 371 (c)(1),
(2), (4) Date: Sep. 12, 2008

(87) PCT Pub. No.: WO2008/071482
PCT Pub. Date: Jun. 19, 2008

(65) Prior Publication Data
US 2009/0087163 A1    Apr. 2, 2009

(30) Foreign Application Priority Data
Dec. 14, 2006  (DE) ................. 10 2006 059 065

(51) Int. Cl.
*H04N 5/93* (2006.01)
*H04N 5/445* (2011.01)
*G08B 13/196* (2006.01)
*H04N 5/76* (2006.01)
*H04N 5/77* (2006.01)
*H04N 7/18* (2006.01)

(52) U.S. Cl.
CPC .......... *H04N 5/445* (2013.01); *G08B 13/19645* (2013.01); *G08B 13/19667* (2013.01); *G08B 13/19669* (2013.01); *G08B 13/19673* (2013.01); *G08B 13/19682* (2013.01); *H04N 5/76* (2013.01); *H04N 5/77* (2013.01); *H04N 7/18* (2013.01)
USPC ........................................... 386/239; 386/326

(58) Field of Classification Search
CPC ...................... G08B 13/19645; H04N 5/445
USPC ...................... 386/46, 239; 345/595, 764
See application file for complete search history.

(56) References Cited

U.S. PATENT DOCUMENTS

| 3,739,369 A | * | 6/1973 | Bunker et al. | ............... 345/595 |
|---|---|---|---|---|
| 6,011,901 A | | 1/2000 | Kirsten | |
| 2003/0009493 A1 | * | 1/2003 | Parker et al. | ............... 707/500.1 |

(Continued)

FOREIGN PATENT DOCUMENTS

| DE | 103 01 455 | 7/2004 |
|---|---|---|
| EP | 1 450 559 | 8/2004 |
| WO | 03/001809 | 1/2003 |
| WO | 2004/068855 | 8/2004 |

OTHER PUBLICATIONS

Cagiltay, K., (2004). Visual Design for Time Based Information: Users' Behavior Patterns and Interface Preferences. Journal of Interactive Instruction Development, v16 n.3 pp. 37-46.*

(Continued)

*Primary Examiner* — Carl Colin
*Assistant Examiner* — Syed Zaidi
(74) *Attorney, Agent, or Firm* — Michael J. Striker

(57) ABSTRACT

The invention relates to a display (30) for displaying the progress of a recording process, which shows video data of events that are recorded during the recording process in chronologically graduated resolution.

18 Claims, 2 Drawing Sheets

(56) References Cited

U.S. PATENT DOCUMENTS

2003/0122874 A1* 7/2003 Dieberger et al. ............ 345/764
2006/0045470 A1  3/2006 Poslinski et al.
2006/0204207 A1  9/2006 Gilge

OTHER PUBLICATIONS

Wolfgang Müller, Heidrun Schumann, Visualization for modeling and simulation: visualization methods for time-dependent data—an overview, Proceedings of the 35th conference on Winter simulation: driving innovation, Dec. 7-10, 2003, New Orleans, Louisiana.*

Silva, S.F.; Catarci, T.; , "Visualization of linear time-oriented data: a survey," Web Information Systems Engineering, 2000. Proceedings of the First International Conference on , vol. 1, no., pp. 310-319 vol. 1, 2000.*

* cited by examiner

DISPLAY FOR DISPLAYING PROGRESS

The present invention relates to a display for displaying the progress of a recording process, a device for preparing video data, a method for preparing video data, a computer program, and a computer program product.

RELATED ART

Video monitoring devices and systems are designed to record large quantities of data over long periods of time. With video data, events that are recorded via video monitoring are captured and retained. Since it is usually too time-consuming to view large quantities of video data, users generally look at the recorded video data only sporadically and/or when unusual events occur.

A method for recording video and audio data is made known in publication DE 103 01 455 A1. In that case, it is provided that a data memory of a pick-up device is connected at least with a recording device that has a greater memory capacity than does the data memory of the pick-up device. In addition, the data are exchanged between the data memory and the at least one recording device. The recording device therefore serves as a virtual data memory for the pick-up device.

DISCLOSURE OF THE INVENTION

The present invention relates to a display for displaying the progress of a recording process. The display shows video data of events that are recorded in the recording process, in chronologically graduated resolution.

With the display or a related graphical display element, an operator or a user of the display may view the progress of the recording process at a glance.

It is therefore possible to continuously monitor the recording process and the events that are being captured. It is therefore possible to reduce the risk of irreplaceable losses of event recordings. In one embodiment, the progress of video data may be displayed in the display in a compact manner, as an overview. Video data of that type are typically recorded over a longer period of time.

In one embodiment, the display shows the progress and/or video data in chronologically graduated resolution. This means that, during an entire period of time in which the recording process takes place, certain time sections or intervals that are recorded at different points in time are displayed and therefore presented in different, suitable resolutions depending on the period of time and/or point in time. Time-dependent priorities for viewing the video data may therefore be set by selecting the resolution accordingly.

In a further embodiment, the display may include a diagram designed as an overview that shows the user the progress of the recording process with consideration for qualitative and/or quantitative aspects. In the diagram, it is possible to display, e.g., a frequency of the video data and/or events as a function of time. Points in time that are particularly interesting in terms of monitoring may be displayed in the graphics with higher resolution. In one embodiment of the display, this means that video data of chronologically more recent events are displayed with a higher resolution than are video data of events that occurred earlier. The resolution may be plotted along a time axis in a manner that is inversely proportional to a chronological difference between this point in time and a point in time when the data are displayed. A measure of the resolution may be defined as being continual over time, or it may be discrete within points of time. Within the embodiment of the present invention, it is provided that the video data are displayed in a manner that is inversely logarithmic to the chronological resolution.

The present invention also relates to a device for preparing video data on events of a recording process that is designed to provide video data in chronologically graduated resolution.

This device may include—as a component—a data processing device for processing video data. It may also be provided that the device includes a display device, typically a monitor, for presenting the display of the progress of a recording process. Accordingly, the device and, in particular, the display device are designed to present video data as a display, optionally on a user interface.

The device may also include a multiple-channel device, which is designed to present the video data of the recording process as an overview and in an accumulated manner for all channels. Detailed information may be presented for each channel, as necessary.

In one embodiment, it is provided that the device includes several channels, which are designed to present video data. The device is typically connected with at least one camera, in particular a video camera, with which the video data for capturing the events are presented during the recording process.

The present invention also relates to a method for displaying the progress of a recording process, with which video data of events are recorded during the recording process, and with which video data are presented in chronologically graduated resolution.

The progress is shown in a display or a related display element. In an exemplary embodiment of the method, video data of chronologically more recent events are displayed with a higher resolution than are video data of events that occurred earlier.

It is also possible for the video data of the recording process to be displayed as an overview and in an accumulated manner for all channels of a multiple-channel device. Detailed information is presented for each channel of the multiple-channel device.

In a further embodiment, a data rate, in particular a data rate of the video data, is displayed. In one embodiment of the method, recording errors that occurred in the recording process or in the video data may also be displayed.

Individual steps of the inventive method may be carried out with individual components of the inventive device and/or the inventive display. Individual functions that may be carried out using components of the inventive device may be suitable—in one embodiment—as further steps in the inventive method.

The present invention also relates to a computer program with program code means for implementing all steps of an inventive method when the computer program is run on a computer or a related arithmetic unit, in particular in an inventive device.

The inventive computer program product with program code means, which are stored on a computer-readable video data storage device, is designed to carry out all steps of an inventive method when the computer program is run on a computer or a related arithmetic unit, in particular on a control device in an inventive device.

The chronologically graduated resolution and, in particular, the inversely logarithmic chronological display of the progress of the recording process make it possible to display chronologically more recent events with higher resolution than events or processes that occurred earlier. It is also possible to indicate—via the display—particular events or error states in color, and to depict a recording rate of the video data and/or events as a curve. A selected view within the display may be shown as an overview and in an accumulated manner for all channels of the multiple-channel system. It may also be provided that the displays are made available as detailed information for every individual channel. In an accumulated display, all recording rates and the sum of the recording rates of all channels are shown, and it is possible for all error states to be superimposed in color.

The display is, therefore, e.g., designed as a component of a user interface that is used to evaluate video data of the recording process.

Further advantages and embodiments of the present invention result from the description and the attached drawing.

It is understood that the features mentioned above and to be described below may be used not only in the combination described, but also in other combinations or alone without leaving the framework of the present invention.

The present invention is depicted schematically with reference to exemplary embodiments in the drawing, and it is described in detail below with reference to the drawing.

EMBODIMENTS OF THE INVENTION

Figure 1:
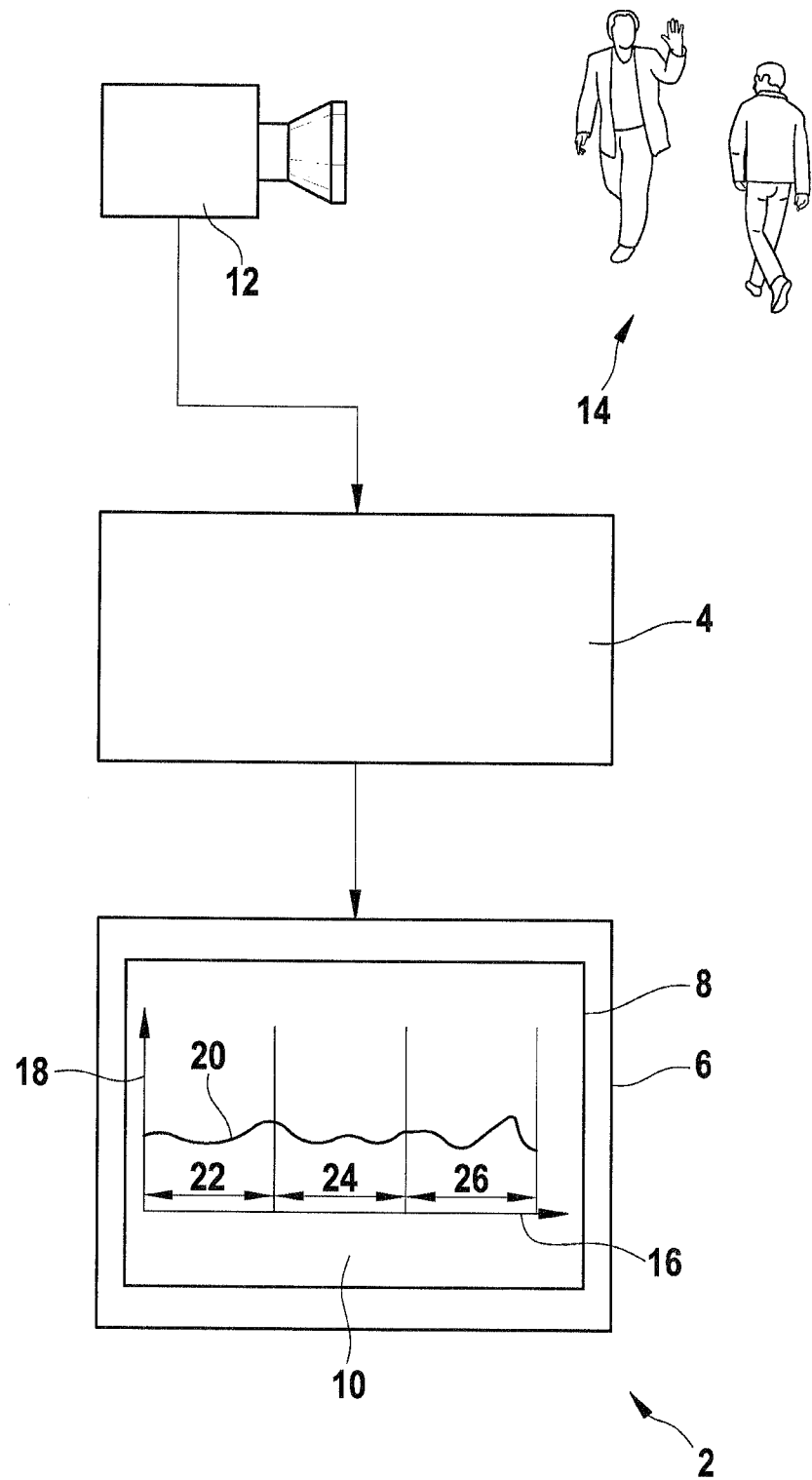
FIG. 1 shows a schematic illustration of an embodiment of an inventive device with a first embodiment of the inventive display.

Inventive device 2 shown in a schematic depiction in FIG. 1 includes a data processing device 4 with an arithmetic unit, which is connected with a display device 6. Display device 6, which is designed as a monitor in this case, includes a user interface 8, on which a first embodiment of inventive display 10 is shown. It is also provided that data processing device 4 of device 2 is connected with a video camera 12. Video camera 12 is designed to record events and to obtain video data from these events. The events may be, e.g., actions carried out by persons 14 who are involved in a scenario being monitored by video camera 12.

The video data are transmitted from video camera 12 to data processing device 4. In the present embodiment, data processing unit 4 is designed to process the video data with consideration for periods of time and instants within which the recording process takes place, in such a manner that the video data on the events are presented in chronologically graduated resolution.

Inventive display 10 within the user interface on display device 6 of inventive device 2 is designed to show the progress of the recording process. Display 10 shows video data of events that are recorded in the recording process, in chronologically graduated resolution. A diagram shown in display 10 includes a horizontal time axis 16 and a vertical events axis 18, along which a frequency of events is plotted as a curve 20. Time axis 16 is subdivided into a first time interval 22, a second time interval 24, and a third time interval 26. In the present invention, it is provided that the video data plotted via curve 20 are shown in chronologically graduated resolution.

This means that the three sections 22, 24, 26 along time axis 16 have the same lengths. These three sections 22, 24, 26 represent time intervals of different lengths, however. In this case, for example, it is provided that first section 22 represents a period of one day, second section 24 represents a period of nine days, and third section 26 represents a period of 90 days. The video data in display 10 shown in FIG. 1 are therefore presented in logarithmic chronological resolution.

Figure 2:
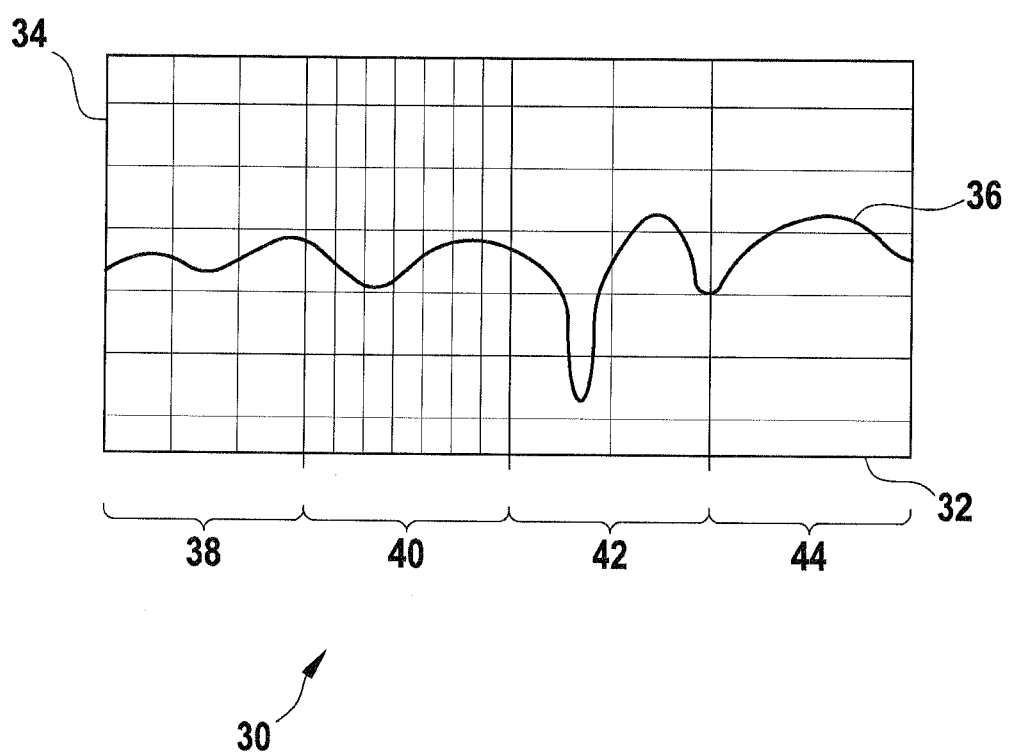
FIG. 2 shows a second embodiment of the inventive display.

FIG. 2 shows a second embodiment of a display 30 that includes a diagram. This diagram includes a horizontal time axis 32 and a vertical events axis 34 for depicting a frequency of video data on the events that were recorded during the recording process.

The video data are also presented as a curve 36 in this case, as in FIG. 1. Display 30 is designed to show the progress of curve 36 of the recording process. Display 30 shows the video data of events that are recorded in the recording process, in chronologically graduated resolution. To this end, in the present embodiment, time axis 32 is subdivided into a first section 38, a second section 40, a third section 42, and a fourth section 44. To present the resolution, first section 38 represents a period of three months, second section 40 represents a period of one week, third section 42 represents a period of one-half of a day, and fourth section 44 represents a period of one hour. With display 30 used in this case, the video data of chronologically more recent events, i.e., events that took place within the last hour, are presented with a higher resolutionn than are video data of events that took place earlier.

What is claimed is:

1. A display for displaying the progress of a recording process, comprising:
   a data processing device; and
   a display device;
   wherein the data processing device processes video data of events that are recorded during the recording process, including determining a recording rate of the video data of the events;
   wherein the recording rate of the video data of the events are displayed in chronologically graduated resolution on the display device to provide an understanding of the progress,
   wherein the recording rate of the video data of chronologically more recent events are displayed on the display device with a higher resolution than the recording rate of the video data of events that occurred before the chronologically more recent events, and
   wherein the video data on the recording rate of the events over time are displayed on the display device in an inversely logarithmic chronological resolution.

2. The display as recited in claim 1, which displays the event rate over time as a curve.

3. The display as recited in claim 2, wherein the curve reflects an error state related to the events.

4. The display as recited in claim 3, wherein the error state is displayed in color.

5. A device, comprising:
   a data processing device, the data processing device configured to prepare video data on events of a recording process, the prepared video data including a recording rate of the events over time; and
   a display device coupled to the data processing device, the display device configured to display the prepared video data on the events in chronologically graduated resolution to provide an understanding of recording progress,
   wherein video data of chronologically more recent events are displayed with a higher resolution than video data of events that occurred before the video data of the chronologically more recent events, and
   wherein the video data on the recording rate of the events over time are displayed in an inversely logarithmic chronological resolution.

6. The device as recited in claim 5, wherein the display device displays the event rate in a form of a curve.

7. The device as recited in claim 6, wherein the curve includes error states associated with the events.

8. The device as recited in claim 5, wherein the data processing device includes several channels and the display device is designed to present video data in association with the several channels.

9. A method for displaying the progress of a recording process, comprising:
   using a video camera to record scenes during the recording process;
   processing the recorded scenes to extract event data; and
   displaying a curve representing a recording rate of the event data recorded during the recording process in chronologically graduated resolution to provide an understanding of the progress,
   wherein event data of chronologically more recent events are displayed with a higher resolution than event data of events that occurred before the chronologically more recent events, and
   wherein the video data on the recording rate of the events over time are displayed in an inversely logarithmic chronological resolution.

10. The method as recited in claim 9, wherein the curve is displayed to show the progress in a display.

11. The method as recited in claim 9, wherein the curve is displayed to show the video data of chronologically more recent events with a higher resolution than are video data of events that occurred earlier.

12. The method as recited in claim 9, wherein the video data of the recording process are displayed as an overview and in an accumulated manner for all channels of a multiple-channel device.

13. The method as recited in claim 12, including displaying detailed information for each channel.

14. The method as recited in claim 9, including displaying recording errors.

15. The method as recited in claim 9, further displaying recorded error states over time.

16. A computer program product with program code means stored on a non-transitory computer-readable video data storage device, to carry out all steps of a method for displaying the progress of a recording process when the program code means is executed by a data processing device or a related arithmetic unit within a device including the data processing device, a video camera and a display device, wherein the method comprises steps of:
   using the video camera to record scenes during the recording process;
   processing the recorded scenes to extract event data; and
   displaying a curve representing a recording rate of the event data recorded during the recording process in chronologically graduated resolution to provide an understanding of the progress,
   wherein event data of chronologically more recent events are displayed with a higher resolution than event data of events that occurred before the chronologically more recent events, and
   wherein the video data on the recording rate of the events over time are displayed in an inversely logarithmic chronological resolution.

17. A method for monitoring progress of a recording process in which events are recorded with a video camera, the method including:
   transferring video data from the video camera to a data processing device;
   processing the video data by the data processing device to determine a frequency of occurrence of particular events and/or error states associated with the particular events over time; and
   displaying a graphical illustration highlighting a frequency of the events and/or error states in chronologically graduated resolution on a display device to highlight the recording process progress,
   wherein the video data of chronologically more recent events are displayed with a higher resolution than video data of events that occurred before the chronologically more recent events, and
   wherein the video data on a recording rate of the events over time are displayed in an inversely logarithmic chronological resolution.

18. The method as recited in claim 17, wherein the error states are highlighted in the display device by color.

* * * * *